United States Patent
Fukaya et al.

(10) Patent No.: US 8,603,341 B2
(45) Date of Patent: *Dec. 10, 2013

(54) OIL ADSORBENT, AND METHOD FOR RECOVERING OIL

(75) Inventors: Taro Fukaya, Nerima-ku (JP); Shinetsu Fujieda, Kawasaki (JP); Shinji Murai, Sagamihara (JP); Akiko Suzuki, Minato-ku (JP); Hideyuki Tsuji, Yokohama (JP); Tatsuoki Kohno, Minato-ku (JP); Nobuyuki Ashikaga, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/091,533

(22) Filed: Apr. 21, 2011

(65) Prior Publication Data

US 2011/0253632 A1  Oct. 20, 2011

Related U.S. Application Data

(63) Continuation of application No. PCT/JP2009/005481, filed on Oct. 20, 2009.

(30) Foreign Application Priority Data

Oct. 22, 2008  (JP) ................. 2008-272453

(51) Int. Cl.
*C02F 1/28* (2006.01)
*C02F 1/40* (2006.01)
*C02F 1/48* (2006.01)

(52) U.S. Cl.
USPC ........... 210/671; 210/680; 210/693; 210/908; 210/924; 502/402; 502/406

(58) Field of Classification Search
USPC ........... 210/223, 242.4, 502.1, 671, 680, 693, 210/908, 924; 502/402, 406
See application file for complete search history.

(56) References Cited

U.S. PATENT DOCUMENTS

| 3,591,494 A | * | 7/1971 | Crouch et al. ............... 210/680 |
| 3,888,766 A | * | 6/1975 | De Young ................... 210/680 |
| 3,890,224 A | * | 6/1975 | Weiss et al. ................. 210/671 |
| 2001/0020602 A1 | * | 9/2001 | Buijtenhuijs et al. ........ 210/690 |
| 2009/0277843 A1 | | 11/2009 | Fukaya et al. |
| 2010/0230358 A1 | | 9/2010 | Fukaya et al. |

FOREIGN PATENT DOCUMENTS

| JP | 49-32466 | 3/1974 |
| JP | 53-96569 | 8/1978 |
| JP | 55-022312 | 2/1980 |
| JP | 60-097087 | 5/1985 |
| JP | 02-241541 | 9/1990 |
| JP | 07-102238 | 4/1995 |
| JP | 2000-176306 | 6/2000 |

OTHER PUBLICATIONS

English Translation of International Preliminary Report on Patentability and Written Opinion of the International Searching Authority issued May 26, 2011, in Patent Application No. PCT/JP2009/005481.

* cited by examiner

*Primary Examiner* — David A Reifsnyder
(74) *Attorney, Agent, or Firm* — Oblon, Spivak, McClelland, Maier & Neustadt, L.L.P.

(57) ABSTRACT

An oil adsorbent is configured so as to include: at least one particle of an inorganic particle and a metallic particle, at least one particle constituting a core; and a polymer covering the core, wherein the polymer is a copolymer made of at least one substance selected from the group of molecular structure A consisting of styrene, butadiene, isoprene, ethylene and propylene and at least one substance selected from the group of molecular structure B consisting of acrylic acid, methacrylic acid, acrylonitrile, vinylpyridine, vinyl alcohol, maleic anhydride and maleic acid.

15 Claims, No Drawings

OIL ADSORBENT, AND METHOD FOR RECOVERING OIL

CROSS-REFERENCE TO RELATED APPLICATIONS

This application is a continuation of prior International Application No. PCT/JP2009/005481, filed on Oct. 20, 2009 which is based upon and claims the benefit of priority from Japanese Patent Application No. 2008-272453, filed on Oct. 22, 2008; the entire contents of all of which are incorporated herein by reference.

FIELD

Embodiments described herein relate generally to an oil adsorbent for recovering oil from water.

BACKGROUND

Recently, the effective utilization of water source is required because of industrial development and population growth. In this point of view, it is very important to reuse waste water such as industrial waste water. The reuse of the waste water can be realized by purifying the waste water, that is, separating other contents from the waste water except the water.

Various methods are known as a method for separating other contents from a liquid. For example, membrane separation, centrifugal separation, activated carbon adsorption, ozone treatment, agglomeration and suspended matter removal with adsorbents can be exemplified. The use of such a method as mentioned above can remove chemical materials such as phosphorous components and nitrogen components contained in water which affect the environment remarkably, and can remove oil and clay dispersed in the water.

Among the separating methods as mentioned above, the membrane separation is one of the most commonly used separating methods, but may be likely to be suffer from the clogging of the fine pores of the membrane in the case of the removal of the oil dispersed in the water, causing the disadvantage that the lifetime of the membrane is shortened. In this point of view, the membrane separation is not appropriate for the removal of the oil from the water in many situations. As a method for removing oil such as heavy oil, therefore, such a removing method as collecting the heavy oil floating on the water surface with an oil boom provided on the water surface, which utilizes the floating property of the heavy oil, adsorbing and recovering the floating heavy oil is employed. Alternatively, such a removing method as laying a hydrophobic material with absorptivity for the heavy oil on the water surface, adsorbing and recovering the floating heavy oil is employed.

Recently, in this point of view, such an attempt as using oil adsorbents is made. Concretely, the oil adsorbents are immersed in the water containing the oil dispersed therein so as to adsorb the oil and then, the oil adsorbents with the adsorbed oil are removed from the water. For example, Reference 1 teaches that oil adsorbents made of respective magnetic particles and respective organic components such as resins covering the corresponding surfaces of the magnetic particles are used so as to adsorb and remove the oil from the water. In this method, however, the dispersion of the oil adsorbents is not excellent so that the oil adsorbent tend to be settled out or floated on the water surface. Therefore, the oil cannot be adsorbed and removed efficiently and effectively by the oil adsorbents.

Moreover, Reference 2 teaches that the oil is adsorbed by the adsorbing polymers as oil adsorbents which include respective hydrophilic blocks and respective hydrophobic blocks, and the adsorbing polymers with the adsorbed oil are removed from the water. In this method, however, the separation between the adsorbing polymers and the water is difficult, causing the spending of one' s labor and more, the adsorbing polymers with the adsorbed oil is softened, causing the deterioration of workability.

On the other hand, Reference 3 teaches that the oil is adsorbed by the magnetized adsorbing particles so that the adsorbing particles with the adsorbed oil are separated by means of magnetic force. For example, the surfaces of the magnetic particles are modified by stearic acid such that the oil in the water is adsorbed and recovered by the magnetic particles. In this method, however, since the surfaces of the magnetic particles are modified by stearic acid or coupling agent of low molecular weight, the thus generated low molecular weight components may contaminate the water adversely.

With all of the removing methods as described in References 1 to 3, since the oil adsorbents are disposed after the adsorption of the oil, the use efficiency of the oil adsorbents is low. Moreover, if the oil adsorbents are not up to standard, the oil adsorbents are disposed as they are. In this point of view, the use efficiency of the oil adsorbents is deteriorated. As a result, a relatively large amount of oil adsorbent is required in order to adsorb and remove the oil to be removed, resulting in the increase in cost relating to the oil removing operation inherently.

DETAILED DESCRIPTION

An aspect of the present invention relates to an oil adsorbent, including: at least one particle of an inorganic particle and a metallic particle, at least one particle constituting a core; and a polymer covering the core, wherein the polymer is a copolymer made of at least one substance selected from the group of molecular structure A consisting of styrene, butadiene, isoprene, ethylene and propylene and at least one substance selected from the group of molecular structure B consisting of acrylic acid, methacrylic acid, acrylonitrile, vinylpyridine, vinyl alcohol, maleic anhydride and maleic acid.

Another aspect of the present invention relates to a method for recovering oil including the adsorption of oil in water using the aforementioned oil adsorbent.

According to the present invention can be conducted an oil adsorbing method using an oil adsorbent which can adsorb oil in water easily and efficiently and thus realized the oil adsorbing method at low cost.

Hereinafter, details, other features and advantages of the present invention will be described.

(Oil Adsorbent)

The oil adsorbent in this embodiment is configured such that at least one particle of an inorganic particle and a metallic particle constitutes a core and a polymer covers the core to form an aggregate as the oil adsorbent. Since the inorganic particle or the metallic particle constitute the core of the oil adsorbent, the inorganic particle and the metallic particle are appropriately selected from an inorganic material and a metallic material which are not chemically changed when the inorganic material and the metallic material are immersed in water for a long period of time.

For example, the inorganic material and the metallic material may be a ceramic material such as molten silica, crystalline silica, glass, talc, alumina, silicate calcium, calcium carbonate, barium sulfate, magnesia, silicon nitride, boron nitride, aluminum nitride, magnesium oxide, beryllium oxide or mica, or a metallic material such as aluminum, iron, copper or an alloy thereof. Alternatively, the materials may be an oxide such as magnetite containing a metallic material listed above, titanic iron, magnetic pyrite, magnesia ferrite, cobalt ferrite, nickel ferrite or barium ferrite.

As will be explained below, particularly, it is desired that the inorganic material and the metallic material contain a magnetic material in view of the advantage in the recovering of the oil adsorbent.

The magnetic material is not limited, but desirably has ferromagnetism in a range of room temperature. In this embodiment however, the magnetic material is not limited to the aforementioned magnetic material, but encompasses normal ferromagnetic material. Concretely, iron, iron alloy, titanic iron, magnetic pyrite, magnesia ferrite, cobalt ferrite, nickel ferrite or barium ferrite can be exemplified.

Among them, the ferrite-based compound can exhibit the intention of the present invention effectively. For example, since the magnetite ($Fe_3O_4$) is not expensive and stable as a magnetic material by itself and in water, the magnetite can be easily and preferably employed for the water treatment.

In this embodiment, the inorganic particle and the metallic particle may be constituted from a magnetic substance. In this case, the magnetic substance is a magnetic powder such that the shape of the magnetic powder may be set in the form of sphere, polyhedron or infinition, but not limited to a specific form. Moreover, the preferable diameter and shape of the magnetic powder can be appropriately determined in view of the manufacturing cost of the magnetic powder, but with regard to the shape of the magnetic powder, the magnetic powder is preferably formed in the form of sphere or polyhedron with round corners.

If the magnetic powder with sharp edges is employed as the inorganic particle and the metallic particle constituting the core of the oil adsorbent, the magnetic powder may scratch the covering polymer, resulting in the difficulty of maintaining the shape of the oil adsorbent. Normal plating treatment such as Cu plating or Ni plating may be conducted for the magnetic powder as occasion demands. Moreover, the surface of the magnetic powder may be treated so as to prevent the corrosion of the magnetic powder.

The magnetic substance may be constituted from the compound made by combining the magnetic powders with a binder such as a resin instead of constituting the magnetic substance directly from the magnetic powder. Namely, the configuration of the magnetic substance is not particularly limited if the magnetic substance generates the magnetic force enough to collect the oil adsorbent containing the magnetic substance.

The size of the magnetic powder is changed on various conditions such as the density of the magnetic powder, the kind and density of the polymer covering the magnetic powder, and the kind and amount of functional group. In this embodiment, however, the average diameter of the magnetic powders is set within a range of 0.05 to 100 µm and preferably within a range of 0.2 to 5 µm. The average diameter is measured by means of laser diffraction. Concretely, the average diameter is measured with the SALD-DS 21 type measuring apparatus (trade name) made by Shimadzu Corporation.

If the average diameter of the magnetic powders is set larger than 100 µm, the size of the aggregated particle containing the magnetic powders becomes too large so that the dispersion of the aggregated particles in water tends to be deteriorated in the recovery of the oil. Moreover, the effective surface of the aggregated particle is decreased so that the adsorbing amount of oil tends to be undesirably decreased. If the average diameter of the magnetic powders is set less than 0.05 µm, the magnetic powders as primary particles are aggregated densely so that the surface of the thus obtained resin complex, that is, the aggregate as the oil adsorbent in this embodiment tends to be undesirably decreased.

The preferable average diameter of the magnetic powders can be also applied for the inorganic particles such as ceramic particles and the non-magnetic metallic particles. The application of the preferable average diameter for the inorganic particles and the non-magnetic metallic particles can exhibit the same effect/function as that in the application of the preferably average diameter for the magnetic powders.

In this embodiment, it is required that the polymer covering the core of the oil adsorbent which is made of the inorganic particle or the like is constituted from a copolymer composed of at least one substance selected from the group of molecular structure A consisting of styrene, butadiene, isoprene, ethylene and propylene and at least one substance selected from the group of molecular structure B consisting of acrylic acid, methacrylic acid, acrylonitrile, vinylpyridine, vinyl alcohol, maleic anhydride and maleic acid.

Since the group of molecular structure A can exhibit lipophilicity and the group of molecular structure B can exhibit hydrophilicity, the group of molecular structure A contributes to the performance of oil adsorption and the group of molecular structure B contributes to the water dispersion. Therefore, the copolymer, that is, the oil adsorbent in this embodiment can satisfy both of the oil adsorption and the water dispersion. As a result, when the oil adsorption treatment using the oil adsorbent is conducted as will be explained below, the oil adsorbent cannot be settled out in water containing oil and located at the surface of the water so as to be dispersed uniformly in the water, originated from the group of molecular structure B. On the other hand, since the oil adsorbent adsorbs the oil sufficiently originated from the group of molecular structure A, the recovery of the oil can be easily conducted at high efficiency.

Here, only one substance is not required to be selected from the group of molecular structure A and/or the group of molecular structure B, but some substances may be selected from the group of molecular structure A and/or the group of molecular structure B. For example, styrene and butadiene may be selected from the group of molecular structure A and acrylonitrile may be selected from the group of molecular structure B to form the corresponding copolymer made of the three molecular structures (monomers).

With regard to the group of molecular structure A, styrene is a most preferable molecular structure, and with regard to the group of molecular structure B, acrylonitrile is a most preferable molecular structure. Moreover, it is preferable that acrylonitrile is selected from the group of molecular structure B when styrene is selected from the group of molecular structure A.

If the combination of styrene and acrylonitrile is employed, the resultant copolymer can exhibit high solvent tolerance when the copolymer is washed by a solvent in the separation process for the oil adsorbent and the oil according to the oil adsorbent method as will be described hereinafter, and thus the configuration of the copolymer, that is, the oil adsorbent can be maintained. Therefore, even though the oil adsorbent is used once at the oil adsorption process, the oil adsorbent can be used repeatedly at the oil adsorption process without any post-treatment.

Here, it is desired that the ratio of the substance selected from the group of molecular structure A: the substance selected from the group of molecular structure B is set to a ratio within a range of 95:5 to 40:60. If the amount of the substance selected from the group of molecular structure A is set more than the amount defined by the desirable ratio, the water dispersion of the oil adsorbent may be deteriorated, lowering the efficiency of oil adsorption. If the amount of the substance selected from the group of molecular structure B is set more than the amount defined by the desirable ratio, the ratio of the molecular structure contributing to the oil adsorption may be decreased, lowering the efficiency of oil adsorption as described before.

The copolymer may be made through random copolymerization, block copolymerization, graft copolymerization or the like, but the kind of copolymerization is not limited.

(Production of Oil Adsorbent)

Then, the producing method of the oil adsorbent in this embodiment will be described.

First of all, the inorganic particles or the like, the copolymer made of the substance(s) selected from the group of molecular structure A and the substance(s) selected from the group of molecular structure B, and a solvent A are prepared and mixed to blend a predetermined slurry solution. Practically, the inorganic particles or the like and the copolymer are dissolved and/or dispersed in the solvent A.

The solvent A is not limited only if the inorganic particles or the like and the copolymer can be dissolved and/or dispersed in the solvent A to form the slurry solution. Preferably, the solvent A is a polar solvent. Since the polar solvent has excellent hydrophilicity, the hydroxyl groups existing on the surfaces of the inorganic particles or the like at relatively small amount have affinity to the solvent A so that the inorganic particles or the like are not aggregated and uniformly dispersed in the solvent A.

In this embodiment, the "hydrophilicity" means a free mixing for water, and concretely, means the state where when a pure water and a given solvent are slowly mixed at the same amount as one another and at a temperature of 20° C. under 1 atm, the thus obtained mixed solution is maintained uniformly to the sight after the flow of the mixed solution is stopped.

If the solvent A is a non-polar solvent, the solvent A has hydrophobicity (in this case, the hydrophobicity means that water solubility is 10% or less) so that the inorganic particles or the like may be aggregated and not dispersed uniformly in the slurry solution. In this point of view, when the oil adsorbents are produced by means of splay-dry as will be described below, some of the oil adsorbents may not contain the inorganic particles and others of the oil adsorbents may contain only the inorganic particles. As a result, since some of the oil adsorbents are produced as inferior oil adsorbents which are not suitable for the adsorption of the oil, it is required that the inferior oil adsorbents are removed through many processes. Moreover, since the compositions of the inferior oil adsorbents are not uniform one another, the composition analysis is required in order to control the concentration of the slurry solution to the predetermined concentration of the intended solution so as to obtain the initial slurry solution in the case of the reuse of the slurry solution, requiring the complicated reuse process.

As the hydrophilic solvent, methanol, ethanol, n-propanol, isopropanol, acetone and tetrahydrofuran may be exemplified. Preferably, acetone and tetrahydrofuran are employed because these hydrophilic solvents can dissolve various polymers.

Then, the slurry solution is splay-dried. The splay-dry is conducted using splay drying method whereby particulate organic matters can be obtained from the slurry solution through the removal of the organic solvent. In this embodiment, the organic matter means a resin composite particle constituted from a core made of the inorganic particle(s) or the like and a polymer covering the core and thus corresponds to the oil adsorbent of the present invention.

According to the splay drying method, the average diameter of the secondary aggregates made by the aggregation of the primary particles can be adjusted by controlling the environmental temperature and splaying velocity in the implementation of the splay drying method. Moreover, when the organic solvent is removed from the spaces of the aggregate made of the primary particles, pores are formed at the aggregate so that the oil adsorbent can be easily formed as a porous structure which is a preferable form for the oil adsorbent.

The splay drying method may be a one well known and commercially available, but may be conducted by using a disc type splay dryer, a pressurized nozzle type dryer or a two-fluid nozzle type dryer.

(Method of Recovering Oil)

Then, the recovering method of oil using the oil adsorbent(s) will be described. The oil recovering operation separates the oil from the water containing the oil. Here, the "oil" means an organic matter, which is maintained as a liquid state at normal temperature and has poor solubility for the water, has a relatively large viscosity and a specific gravity smaller than the water among the organic matters mixed and dispersed in the water. Concretely, animal oil or fat, vegetable oil or fat, hydrocarbon and aromatic oil may be exemplified. The exemplified oils or fats are typified by aliphatic acid glyceride, petroleum, higher alcohol. Since these oils or fats have the respective characteristic functional groups, the polymer composing the oil adsorbent and the functional group(s) of the oil adsorbent can be selected commensurate with the characteristic functional groups of the oils or fats.

First of all, the oil adsorbents are immersed and dispersed in the water containing the oil. As described above, since the oil adsorbents have the respective polymers with lipophilicity originated from the group of molecular structure A, the oil can be adsorbed by the oil adsorbents originated from the affinity of the polymer to the oil. In this case, if the surface of each of the oil adsorbents is not smooth but porous, the efficiency of oil adsorption can be developed. As described above, if the oil adsorbents are produced by means of splay drying method, the oil adsorbents are likely to be produced in the form of porosity, so that the oil adsorbents can exhibit an excellent efficiency of oil adsorption due to the porous structure thereof inherently.

After the oil is adsorbed by the oil adsorbents, the oil adsorbents are separated from the water so as to separate the oil from the water. The separation of the oil adsorbents can be easily conducted by a well known technique such as the settlement using the force of gravity applied to the oil adsorbents or the centrifugal force using a cyclone separator. Moreover, when the inorganic particles or the like contain the magnetic substances, the separation of the oil adsorbents can be conducted by using the magnetic force of the magnetic substances.

The kind of the water to be treated in oil recovery is not restricted. Concretely, industrial discharged water, sewage water and domestic waste water can be treated by the oil recovering method as described above. The concentration of the oil contained in the water to be treated is not restricted.

After the oil adsorbents adsorb the oil and separate the oil from the water, the oil adsorbents are washed by a solvent B so as to remove the oil therefrom. The solvent B must not dissolve the polymers of the oil adsorbents. Concretely, the solvent B is selected so as to satisfy the condition that the solubility of the polymers for the solvent B is set to 1000 mg/L or less.

The kind of the solvent B depends on the kind of the covering polymers of the oil adsorbents and the kind of surface modification of the oil adsorbents. For example, methanol, ethanol, n-propanol, isopropanol, butanol, isobutanol, hexyl alcohol, cyclohexanol, acetone, methyl ethyl ketone, methyl isobutyl ketone, methyl acetate, ethyl acetate, propyl acetate, butyl acetate, diethyl ether, isopropyl ether, dibutyl ether, tetrahydrofuran, dioxane, cyclohexane, chloroform, dimethylaniline, chlorofluorocarbon, n-hexane, cyclohexanone, toluene, xylene may be exemplified.

Among the exemplified solvents, a non-polar solvent is particularly preferable. Since the non-polar solvent has hydrophobicity and high affinity to the oil, the oil adsorbed to the oil adsorbents can be easily and efficiently washed and removed. Moreover, if the non-polar solvent is employed, the damaged oil adsorbents can be easily separated and removed. Here, the "hydrophobicity" means that the water solubility is 10% or less and an intended substance such as the solvent is separated from the water. Particularly, hexane is preferable because hexane can exhibit higher solubility for the oil and is stable liquid at room temperature due to the higher boiling point of about 70° C. Therefore, hexane is easy to be handled and thus, preferable.

The solvent B may be an alcohol. In this case, the moisture content adhered or adsorbed on the surfaces of the oil adsorbents is likely to be substituted with the alcohol so that the impurities except the oil can be easily removed. As the alcohol, methanol and ethanol are preferable because these alcohols have the respective low boiling points.

In this process, the oil adsorbents are charged in a column and the solvent B is flowed in the column, for example. Alternatively, when the oil adsorbents contain the respective magnetic substances, the oil adsorbents are input into a washing vessel while a large amount of the solvent B is also input into the washing vessel, and separated with a cyclone separator or by means of magnetic force.

As described above, when styrene is selected from the group of molecular structure A and acrylonitrile is selected from the group of molecular structure B, the resultant oil adsorbents can exhibit high solvent tolerance against the solvent B and thus maintain the initial structures thereof. Therefore, even though the oil adsorbents are used once at the oil adsorption process, the oil adsorbent can be used repeatedly at the oil adsorption process without any post-treatment.

Then, after the oil is separated from the oil adsorbents, the oil adsorbents are dried to remove the solvent B therefrom. In this case, if the oil adsorbents are not damaged and are up to standard, the oil adsorbents can be reused by removing the solvent B perfectly therefrom. The drying process is not limited. For example, the oil adsorbents are set under an airy atmosphere or a depressurized atmosphere in order to remove the solvent B. Alternatively, the oil adsorbents are charged in a column while an air is blown in the column in order to remove the solvent B.

Then, the present invention will be described in reference to examples.

EXAMPLE 1

<Production of Oil Adsorbent(s)>

First of all, 6 parts by weight of a copolymer which was made from styrene selected from the group of molecular structure A and acrylonitrile selected from the group of molecular structure B through the random copolymerization under the condition that the ratio of styrene/acrylonitrile was set to 70/30 was dissolved in 300 ml of tetrahydrofuran to form a solution. Then, 40 parts by weight of spherical magnetite particles with an average particle diameter of 800 nm (each specific surface being 5.7 $m^2/g$) was dispersed in the solution to form a composition, which was splayed using a mini splay dryer (made by SIBATA SCIENTIFIC TECHNOLOGY LTD., B-290 type) to form spherically aggregated resin composites, that is, oil adsorbent particles with an average secondary particle diameter of about 20 μm. When some of the oil adsorbent particles were observed by means of SEM, it was turned out that the oil adsorbent particles were produced in the form of porosity. When 1 g of the oil adsorbent particles was mixed with 1 L of water, the oil adsorbent particles were dispersed in the water under good condition and after one minute elapsed from the stop of agitation, almost kept to be dispersed in the water.

<Recovery of Oil>

Then, 1 g of the oil adsorbent particles was put in a conical flask equipped with a stopper and with a capacity of 1 L while 200 ml of water containing 500 μL of linear aliphatic oil was put in the conical flask. Then, the oil adsorbent particles were agitated sufficiently so as to adsorb the oil by the oil adsorbent particles. Then, the oil adsorbent particles were separated in another conical flask by using a magnetic force of a magnet, agitated and washed by the addition of 100 ml of hexane to separate the oil from the oil adsorbent particles. When the hexane was analyzed by using a gas chromatograph mass spectrometer to measure the amount of the oil adsorbed by the oil adsorbent particles, it was turned out that the oil of 499.9 μL or more (less than detection limit of oil concentration in water) was adsorbed by the oil adsorbent particles.

Then, the oil adsorbent particles were put into 10 ml of hexane and agitated sufficiently. Thereafter, when the oil adsorbent particles were separated from the hexane by using a magnetic force of a magnet and the remaining hexane was analyzed, it was turned out that all of the oil adsorbed to the oil adsorbent particles was separated from the oil adsorbent particles. When the oil adsorbent particles were observed by a SEM after the separation thereof, the oil adsorbent particles kept the initial porous structure before the aforementioned adsorbing process.

Then, after the oil adsorbents were washed, the oil adsorbents were put into a stainless vat and dried in an organic draft chamber for 30 minutes. As a result, the hexane was perfectly removed from the oil adsorbent particles. Thereafter, the oil adsorbent particles were treated by using a dry-type cyclone to remove smaller particles and collect the remaining particles as oil adsorbent particles under good condition. The resultant oil adsorbent particles were employed as recycled oil adsorbent particles and put into 200 ml of water containing 500 ml of oil so as to adsorb the oil in the water as described above. As a result, it was turned out that the oil of 499.9 μL or more was adsorbed by the recycled oil adsorbent particles.

EXAMPLE 2

The intended oil adsorbent particles were produced in the same manner as Example 1 except that the ratio of styrene/acrylonitorile was varied to 95/5. The oil adsorbent particles were dispersed in the water and, it was turned out, adsorbed the oil of 499.9 μL or more as the result of the measurement. Moreover, it was recognized the adsorbed oil was perfectly removed by using the hexane.

EXAMPLE 3

The intended oil adsorbent particles were produced in the same manner as Example 1 except that the ratio of styrene/ acrylonitorile was varied to 40/60. The oil adsorbent particles were dispersed in the water and, it was turned out, adsorbed the oil of 499. 9 µL or more as the result of the measurement. Moreover, it was recognized the adsorbed oil was perfectly removed by using the hexane.

EXAMPLE 4

The intended oil adsorbent particles were produced in the same manner as Example 1 except that the ratio of styrene+butadiene/acrylonitorile was varied to 60+20/20. In this case, the styrene and butadiene was selected from the group of molecular structure A and the acrylonitrile was selected from the group of molecular structure B. The oil adsorbent particles were dispersed in the water and, it was turned out, adsorbed the oil of 499.9 µL or more as the result of the measurement. Moreover, it was recognized the adsorbed oil was perfectly removed by using the hexane.

EXAMPLE 5

The intended oil adsorbent particles were produced in the same manner as Example 1 except that a copolymer which was made from styrene selected from the group of molecular structure A and maleic anhydride selected from the group of molecular structure B through the block copolymerization under the condition that the ratio of styrene/maleic anhydride was set to 86/14 was employed. The oil adsorbent particles were dispersed in the water under good condition and, it was turned out, adsorbed the oil of 499.9 µL or more as the result of the measurement. Moreover, it was recognized the adsorbed oil was perfectly removed by using the hexane. When the oil adsorbent particles were maintained in water for one day, the oil adsorbent particles were settled out to form aggregate particles, which were aggregated again to form an aggregate later. By agitating the water sufficiently, however, the aggregate was separated into aggregate particles. Therefore, it was recognized that the oil adsorbents were able to be recycled without any problem after the maintaining in the water.

EXAMPLE 6

The intended oil adsorbent particles were produced in the same manner as Example 1 except that a copolymer which was made from styrene selected from the group of molecular structure A and vinylpyridine selected from the group of molecular structure B through the block copolymerization under the condition that the ratio of styrene/vinylpyridine was set to 75/25 was employed. The oil adsorbent particles were dispersed in the water under good condition and, it was turned out, adsorbed the oil of 499.9 µL or more as the result of the measurement. Moreover, it was recognized the adsorbed oil was perfectly removed by using the hexane. When the oil adsorbent particles were maintained in water for one day, the oil adsorbent particles were settled out to form aggregate particles, which were aggregated again to form an aggregate later. By agitating the water sufficiently, however, the aggregate was separated into aggregate particles. Therefore, it was recognized that the oil adsorbent was able to be recycled without any problem after the maintaining in the water.

EXAMPLE 7

The intended oil adsorbent particles were produced in the same manner as Example 1 except that a copolymer which was made from ethylene selected from the group of molecular structure A and vinyl alcohol selected from the group of molecular structure B through the block copolymerization under the condition that the ratio of ethylene/vinyl alcohol was set to 81/19 was employed and a mixture of water and isopropanol was employed as the solvent for producing the intended oil adsorbent particles. The oil adsorbent particles were dispersed in the water under good condition and, it was turned out, adsorbed the oil of 499.9 µL or more as the result of the measurement. Moreover, it was recognized the adsorbed oil was perfectly removed by using the hexane. When the oil adsorbent particles were maintained in water for one day, the oil adsorbent particles were settled out to form aggregate particles, which were aggregated again to form an aggregate later. By agitating the water sufficiently, however, the aggregate was separated into aggregate particles. Therefore, it was recognized that the oil adsorbent was able to be recycled without any problem after the maintaining in the water.

EXAMPLE 8

The intended oil adsorbent particles were produced in the same manner as Example 1 except that silica particles (specific surface being 6.4 m$^2$/g) with an average diameter of 500 nm were employed instead of the magnetite particles. The oil adsorbent particles were dispersed in the water and, it was turned out, adsorbed the oil of 499.9 µL or more as the result of the measurement. Moreover, it was recognized the adsorbed oil was perfectly removed by using the hexane. However, since the oil adsorbent particles contain no magnetic substances, it took long period of time to separate the oil adsorbent particles from the water because the oil adsorbent particles were required to be settled out in the water.

As apparent from Examples 1 to 8, the oil adsorbent particles, which are made by covering the magnetic particles or the like with the copolymers made from the substance(s) selected from the group of molecular structure A and the substance(s) selected from the group of molecular structure B, can balance the dispersion in water and the oil adsorption and thus exhibit excellent oil adsorption performance.

In Examples, concrete data related to every substance belonging to the group of molecular structure A and every substance belonging to the group of molecular structure B were not indicated, but it was recognized that even though another substance selected from the group of molecular structure A and another substance selected from the group of molecular structure B, which the substances were not indicated in Examples, were employed, the function/effect similar to that in Examples was able to be exhibited.

Although the present invention was described in detail with reference to the above examples, this invention is not limited to the above disclosure and every kind of variation and modification may be made without departing from the scope of the present invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An oil adsorbent, comprising:
   at least one particle selected from the group consisting of an inorganic particle and a metallic particle, wherein said at least one particle constituting a core; and
   a polymer covering said core,
   wherein said polymer is a copolymer formed from at least one substance of molecular structure A selected from the group consisting of styrene, butadiene, isoprene, ethylene and propylene and at least one substance of molecular structure B selected from the group consisting of acrylic acid, methacrylic acid, acrylonitrile, vinylpyridine, vinyl alcohol, maleic anhydride and maleic acid,
   wherein a combination of the core and the polymer is formed as a porous structure.

2. The oil adsorbent as set forth in claim 1,
   wherein said at least one substance of molecular structure B is acrylonitrile.

3. The oil adsorbent as set forth in claim 1,
   wherein said at least one substance of molecular structure A is styrene.

4. The oil adsorbent as set forth in claim 1,
   wherein a ratio of said at least one substance of molecular structure A to said at least one substance of molecular structure B is from 95:5 to 40:60.

5. The oil adsorbent as set forth in claim 1,
   wherein said oil adsorbent is made by a splay drying method.

6. The oil adsorbent as set forth in claim 5,
   wherein said oil adsorbent is made by using a polar solvent.

7. The oil adsorbent as set forth in claim 1,
   wherein said at least one particle comprises a magnetic substance.

8. The oil adsorbent as set forth in claim 7,
   wherein said magnetic substance contains a ferrite-based compound.

9. A method for recovering oil, comprising:
   adding an oil adsorbent according to claim 7 in water containing oil; and
   adsorbing said oil from said water by lipophilicity of the group of the molecular structure A of said adsorbent.

10. A method for recovering oil, comprising:
    adding an oil adsorbent according to claim 1 in water containing oil; and
    adsorbing said oil from said water by lipophilicity of the group of the molecular structure A of said adsorbent.

11. A method for recovering oil, comprising:
    preparing an oil adsorbent comprising
        at least one particle selected from the group consisting of an inorganic particle and a metallic particle, wherein said at least one particle constitutes a core; and
        a polymer covering said core, wherein said polymer is a copolymer formed from at least one substance of molecular structure A selected from the group consisting of styrene, butadiene, isoprene, ethylene and propylene and at least one substance of molecular structure B selected from the group consisting of acrylic acid, methacrylic acid, acrylonitrile, vinylpyridine, vinyl alcohol, maleic anhydride and maleic acid;
        wherein a combination of the core and the polymer is formed as a porous structure;
    immersing and dispersing said oil adsorbent in water containing oil, thereby adsorbing said oil with said oil adsorbent; and
    separating and collecting said oil adsorbent from said water.

12. The method as set forth in claim 11, further comprising:
    washing said oil adsorbent with a solvent after said oil adsorbent is separated and collected; and
    drying said oil adsorbent, thereby removing to remove said solvent.

13. The method as set forth in claim 12, further comprising:
    determining whether said oil adsorbent is up to standard or not after said solvent is removed and reusing said oil adsorbent if said oil adsorbent is up to standard.

14. The method as set forth in claim 12,
    wherein said solvent is a non-polar solvent.

15. The method as set forth in claim 11,
    wherein said at least one particle comprises a magnetic substance.

* * * * *